May 28, 1957
B. A. MAIN, JR
2,793,883
FLEXIBLE JOINT FOR RIGID TUBES
Filed Feb. 9, 1953
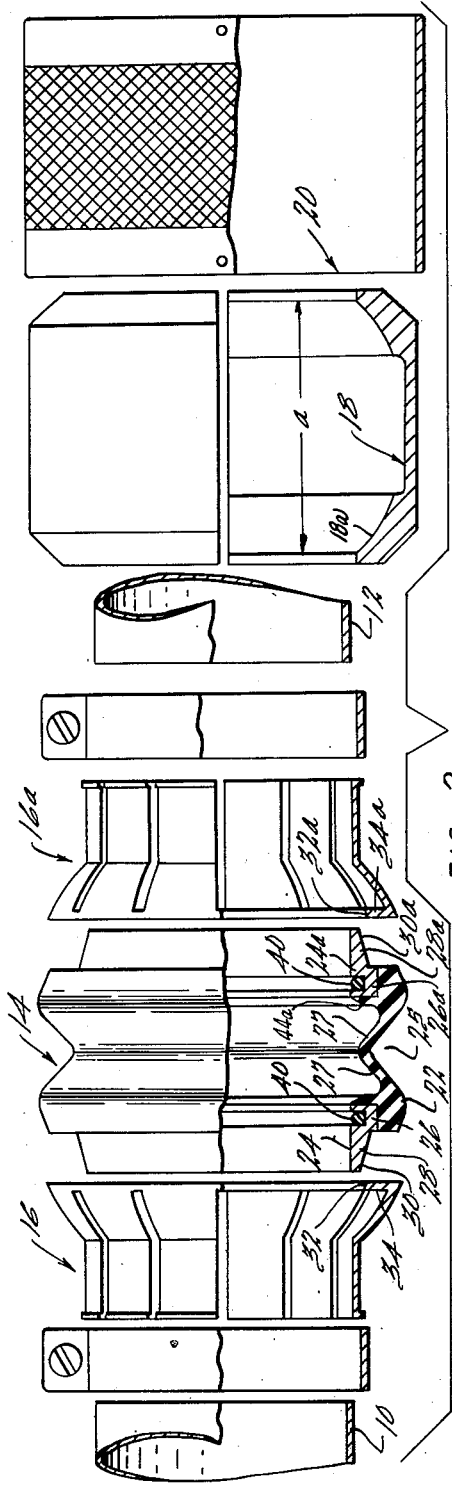
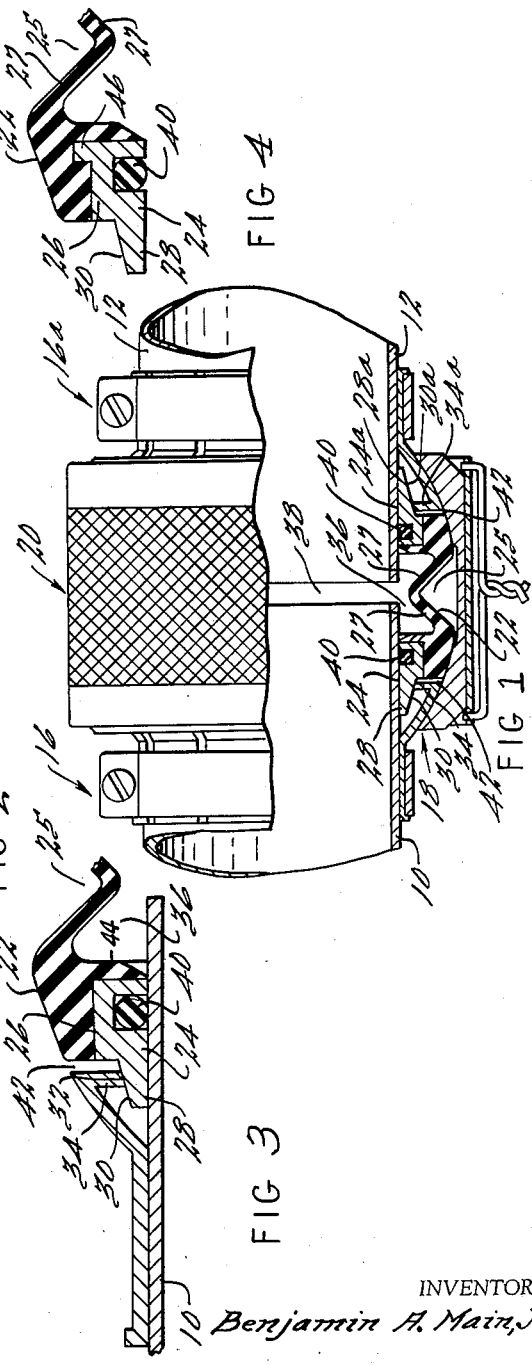
INVENTOR
Benjamin A. Main, Jr.
BY Townsend F. Beaman
ATTORNEY

United States Patent Office 2,793,883
Patented May 28, 1957

2,793,883

FLEXIBLE JOINT FOR RIGID TUBES

Benjamin A. Main, Jr., Rives Junction, Mich., assignor to Aeroquip Corporation, Jackson, Mich., a corporation of Michigan Application February 9, 1953, Serial No. 335,929

3 Claims. (Cl. 285—229)

The present invention relates to flexible fluid sealed joints for connecting the ends of rigid tubes in fluid flow relationship while permitting limited relative movement between the connected tube ends, including relative rocking movement and accommodation for misalignment of the pipe ends, and at the same time maintaining an efficient fluid seal between the connected tubes. In particular the invention relates to fluid sealed flexible joints as disclosed in the co-pending application Serial No. 236,962, filed July 16, 1951, in the names of John Smisko and Roger R. La Marre, assigned to Aeroquip Corporation.

In the construction and assembly disclosed in this said prior application a ring of rubber, or like elastomeric material, is fitted over the axially spaced opposed ends of two tube sections so as to constitute a fluid sealed connection with the tube ends and form an enclosed annular chamber into which the conducted pressure fluid can enter to force radial side walls of this ring into contact with radial side walls of a pair of similar combined locating and gripping collar-like elements adjustably secured upon the outer surfaces of the tube sections. These collar-like elements are formed with oppositely directed spherical surfaces over which corresponding surfaces on the interior of a sleeve member engage, with the sleeve member embracing the colar-like elements and ring and holding the thus constituted joint parts in fluid sealed relation with respect to each other and with the tube sections but permitting limited relative rocking movement between the tube sections, as well as accommodating limited misalignment of the tube sections.

As just indicated, with this prior construction the ring has radial faces engaged with radial faces of the combined locating and gripping elements. It has been realized, in practice, with the use of these fluid sealed flexible joints over wide ranges of pressure and temperature that unavoidable tolerances between the fitted parts and the forces involved gave rise to undesirable relative movement between the elastomeric ring and the tube sections such that at low temperatures, in particular, in the order of —65° F., for instance, leakage occurred. It should be explained here that at such low temperature the elastomeric material relied upon to effect a fluid seal with the tube sections loses its elasticity to the extent that it is unable elastically to accommodate movements of the tube setcions and so maintain sealing engagement therewith. It should be further pointed out with respect to the prior joint that a stretching of the elastomeric ring is relied upon to accommodate relative movements at the joint, which, however, would be adversely affected if the elastomeric material lost its elasticity.

It is an important object of the present invention, therefore, to provide a flexible fluid sealed joint of the above kind in which the elastomeric ring is able to maintain sealing engagement with the tube sections over the widest possible pressure and temperature ranges, including temperatures in the order of —65° F.

A further object of the invention is to provide a flexible fluid sealed joint of the above kind in which an increase of axial pressure within the elastomeric ring by the enclosed pressure fluid increases the mechanical connection between the ring and the connected tube ends as well as between the ring and the combined locating and gripping collar-like elements, whereby to resist destroying the fluid seal between the ring and the tube ends under all operating conditions.

It is thus an important object of the invention to provide that the mechanical connection between the joint parts and the tube ends becomes more rigid as the pressure increases, whereby relative movement between the joint parts and the tube ends is so minimized that the elastomeric ring is able to maintain its desired sealing contact.

A further important object of the present invention is to provide an improved elastomeric ring structure in which the ring structure incorporates separate sealing means for maintaining fluid sealed engagement with the tube sections and in which relative movements at the joint are accommodated by a deflection of the elastomeric ring as distinct from a stretching thereof.

Thus, in accordance with the invention the elastomeric ring incorporates rigid portions containing fluid sealing rings and the elastomeric ring is made of bellows form and is subjected to axial compression when installed such that relative movement at the joint is accommodated by angular deflection of the walls constituting the bellows.

Further objects and advantages of the invention, residing in the construction, arrangement and combination of parts will appear clear from a consideration of the following detail description of the invention with reference to the drawings and from the appended claims.

In the drawings,

Fig. 1 is a side view of a joint assembly in accordance with the invention, showing the parts in assembled position, with the top half of the figure in longitudinal section and the bottom half in elevation, and the tube sections broken away, Fig. 2 is a similar view to Fig. 1 but showing the joint parts in exploded, disassembled condition, Fig. 3 is an enlarged fragmentary section of the improved sealing ring and adjustable clamping means provided in accordance with the present invention, and Fig. 4 is a similar view to Fig. 3 but of a modified construction of sealing ring.

Referring to the drawings, 10 and 12 indicate the opposed end portions of two rigid tubes which are flexibly held in fluid flow and sealed relationship by a detachable joint assembly comprising a central sleeve structure, indicated generally at 14, a pair of similar locating and gripping rings, indicated generally at 16 and 16a, a connector sleeve, indicated generally at 18 and a retaining sleeve, indicated generally at 20.

The construction and assembly of these joint parts is substantially the same as disclosed in the said pending application, Serial No. 236,962 filed July 16, 1951, but involves important differences and improvements centered upon the sleeve structure 14 and the locating and gripping means 16 and 16a.

According to these improvements the sleeve structure 14 is of composite construction and comprises a main sleeve-like body part 22 of rubber, or other suitable elastomeric material, to which there is secured at each end, on the interior of the sleeve, a metal collar 24, 24a having an inner end ring 26, 26a of channel section and an end sleeve extension 28, 28a presenting a wedge taper exterior surface 30, 30a to a correspondingly tapered edge 32, 32a of the radial end wall 34, 34a of the locating and gripping means 16 and 16a.

The ring portions 26, 26a may be bonded to the material of the sleeve 22, which sleeve is of bellows form, and presents an annular exterior groove 25 of angular section defined by the inclined walls 27, which in use are subjected to the pressure of the fluid conducted through the connected tube sections and admitted, via the gap 38 between the connected tube sections, into the space 36 enclosed by the sleeve.

A sealing ring 40, in the form of an O ring, is fitted into the channels of the ring parts 26, 26a for maintaining sealing engagement with the exterior surfaces of the tubes 10 and 12.

It is to be noted that clearance, indicated by the gap 42, is provided between the radial walls 34, 34a of the parts 16 and 16a and the radial walls 44 and 44a of the sealing ring. This permits the sleeves 28, 28a to move into tighter wedging engagement with the edge surfaces 32, 32a as the pressure is increased within the sealing ring enclosure 36 and exerts axial pressure against the radial side walls 44, 44a of the sealing ring. The angle of the sleeve surfaces 30, 30a and the edge surfaces 32, 32a is in the order of 15°.

In the modified form of sealing ring illustrated in Fig. 4 the metal collar 24 is formed with radial outward annular extension 46 of the inner wall of the channel section ring portion 26, whereby increased surface area is presented for bonding the rubber sealing sleeve 14 to these collar elements.

It is important to note that not only does the present invention provide a wedge connection between the sealing ring sleeve portion 28 and the collar elements 16, 16a but that these sleeve portions provide axially extended bearing contact with the tube sections 10 and 12 and thus maintain a substantially rigid connection with the tube sections, such as minimizes the possibility of relative movement between the sealing ring and the tube sections.

It is also important to note that the distance a (Fig. 2) on the interior of the connector sleeve 18 containing the spherical annular bearing surfaces 18a is so chosen that when the sleeve 14 and the collars 16, 16a are initially mounted in position upon the tube ends with the taper surfaces 30, 32 and 30a, 32a, engaged and located substantially as seen in Fig. 1, the application of the connector sleeve 18 over the thus assembled parts will cause the bellows portion 25, 27, 27 of the elastomeric sleeve 14 to be compressed and thus place the walls 27, 27 under initial tension. Such will be the condition of these walls 27, 27 in the fully assembled condition of the parts as seen in Fig. 1, in which the angle of the exterior angular recess 25 is shown smaller than in Fig. 2. This feature is of importance, since relative movement occurring at the thus jointed parts will be accommodated by angular deflection of the inclined walls 27, 27 of the elastomeric sleeve 14, with these walls tending to assume their unstressed condition during such relative movement. Further, the sealing rings 40, being mounted in the rigid ring parts 26, 26a, are not adversely affected by this deflecting motion of the walls 27, 27 of the elastomeric sleeve 14.

Having thus described my invention what I claim as new and wish to secure by Letters Patent is as follows:

1. A flexible fluid sealed joint for rigid unthreaded tube ends having the ability to permit relative rocking movement between the jointed tubes as well as limited axial movement and misalignment of the tubes comprising a sleeve of elastomeric material presenting side walls engageable over end portions of two axially adjacent tubes to define an enclosed space open to the interior of the thus connected tubes, each said side wall including sealing means maintaining a fluid sealed connection about the corresponding tube and including also a sleeve portion extending axially away from said sleeve and encircling the corresponding tube, said sleeve portions presenting wedge angle tapered exterior surfaces, locator means engageable over said tubes to locate said sleeve in position upon the tubes, said locator means having tapered edge portions engaged with said tapered sleeve surfaces, said locator means being constituted by separate collar elements axially adjustable upon the said tubes and incorporating releasable securing means for securing said collar elements in adjusted position, said collar elements including annular walls defining said tapered edge portions, said annular walls having axial clearance with respect to said sealing sleeve side walls, and connector sleeve means embracing said sleeve and locator means to limit axial separation of said tube ends and to give support to said sleeve.

2. A flexible fluid sealed joint for rigid tubes having plain exterior surfaces and in which the joint permits relative swinging motion between the jointed tube ends as well as limited axial movement and misalignment of the tubes comprising a sleeve of elastomeric material, a rigid ring secured on the inner surface of said sleeve at each end thereof, each said ring having an annular groove on its interior surface and a ring of fluid sealing material seated in said groove, each said ring also having a wedge angle tapered exterior surface, said sleeve and rings being axially slidable as a unit upon the exterior surfaces of said tube ends, said rings being axially slidable upon the tube ends with an intermediate portion of the sleeve bridging the tube ends in radially spaced relation thereto, separate collar means each having an interior wedge angle tapered surface complementary to said tapered ring surfaces, said collars being axially slidable upon said tube ends into position where their said tapered surfaces have wedge engagement with said tapered ring surfaces and prevent relative movement between the collars and rings, whereby said sealing rings have static fluid sealing engagement with the tubes, means for tightening said collars upon the tubes with said wedge angle surfaces so engaged, and rigid connector sleeve means engageable over said collars and sleeve in axial confining relationship thereto, said connector sleeve and collars having mutually engageable part spherical surfaces permitting said relative swinging motion of the tube ends to take place and said intermediate portion of the elastomeric sleeve being formed so as to be also radially spaced from the interior surface of said connector sleeve when the latter is secured over the said collars and elastomeric sleeve, whereby said intermediate sleeve portion is free to flex radially inwards and outwards.

3. The invention as defined in claim 2, said intermediate portion of the elastomeric sleeve being longitudinally V-shaped in cross-section, the walls of said angular section intermediate portion converging inwardly and being longitudinally compressed when said connector sleeve is secured over said elastomeric sleeve and collars.

References Cited in the file of this patent

UNITED STATES PATENTS

| | | |
|---|---|---|
| 656,667 | Schmid | Aug. 28, 1900 |
| 1,665,810 | Gillick | Apr. 10, 1928 |
| 2,246,436 | Downey | June 17, 1941 |
| 2,318,006 | Mercier | May 4, 1943 |
| 2,508,914 | Graham | May 23, 1950 |
| 2,652,895 | Arrowood | Sept. 22, 1953 |

FOREIGN PATENTS

| | | |
|---|---|---|
| 479,569 | Great Britain | Feb. 8, 1938 |